Patented Mar. 26, 1946

2,397,250

UNITED STATES PATENT OFFICE 2,397,250

COMPOUNDS OF THE IMIDAZOLIDONE SERIES AND PROCESS OF MAKING THEM

Robert Duschinsky, Essex Fells, N. J., assignor to Hoffmann-La Roche, Inc., Nutley, N. J., a corporation of New Jersey No Drawing. Application April 29, 1944, Serial No. 533,396

18 Claims. (Cl. 260—309)

My invention relates to the synthesis of imidazolidone derivatives of the general formula I 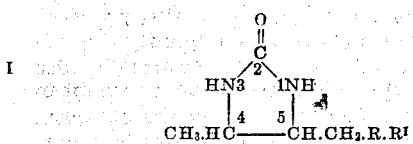

wherein R means a lower alkylene radical, and $R^I$ is a radical selected from the group consisting of H and $COOR^{II}$ in which $R^{II}$ stands for a radical selected from the group consisting of hydrogen and lower alkyl.

One of these imidazolidone derivatives, namely, an optically active form of 4-methyl-5-imidazolidone-(2)-caproic acid, also known as desthiobiotin (III), has been shown to be physiologically active by du Vigneaud and co-workers, Science 98, 497 (1943) and 99, 203 (1944), and by Lilly and Leonian, Science 99, 205 (1944). These authors found desthiobiotin to be growth-promoting for certain microorganisms, while it is growth inhibiting and has an antibiotin action for others. Du Vigneaud and co-workers (1. c.) and du Vigneaud, Folkers and co-workers, J. Biol. Chem. 146, 475 (1942), isolated desthiobiotin as a degradation product of biotin (II), when they become interested in determining the chemical structure of biotin prior to attempting its synthesis. As is well known, biotin which is a substance occurring in nature, has recently attracted considerable interest owing to the fact that it was found to be physiologically active as a growth promoter for microorganisms and as a vitamin for higher animals, the absence of which will cause typical deficiency ailments.

Desthiobiotin was derived from biotin by treating the latter with Raney nickel, thereby splitting out the sulfur atom from the biotin molecule and replacing it by hydrogen. The structural formulae of the two substances were determined to be as follows:

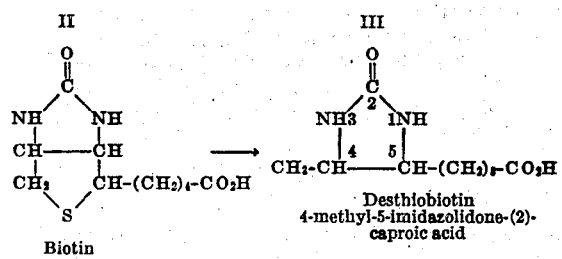

Biotin

Desthiobiotin
4-methyl-5-imidazolidone-(2)-caproic acid

To my knowledge, no method for the synthesis of this imidazolidone derivative has so far been suggested or described. In view of its biological activity, it is clear that the synthesis of desthiobiotin and of related substances should be of considerable interest to the art. It is, therefore, an object of my invention to develop a synthesis of the imidazolidone derivatives which respond to the above stated general formula.

I have discovered that a complete synthesis can be accomplished by a method embodying a combination of steps which involve novel and, I believe, unforeseeable reactions. The reaction scheme shown below illustrates the method. Starting from the readily accessible compound IV, a methyl imidazolone ester, which was first described by Gabriel and Posner, Ber. 27, 1144 (1894), I proceed to eliminate the esterified carboxyl group in 5-position by treating the compound with a saponifying agent. The resulting compound V, methyl imidazolone, is then substituted in 5-position by an acyl radical which is introduced through a Friedel-Crafts condensation with a compound of the formula Halogen·CO·R·$R^I$ wherein R and $R^I$ have the above indicated meanings, thus resulting in compound VI. The latter is hydrogenated to eliminate in one step the keto group in the side chain attached in 5-position (see compound VII), and the double bond between the 4 and 5 carbon atoms in the ring whereby the compound I having the general formula shown above is finally obtained. The hydrogenation may also be performed in two steps in which the compound VII is isolated as an intermediate.

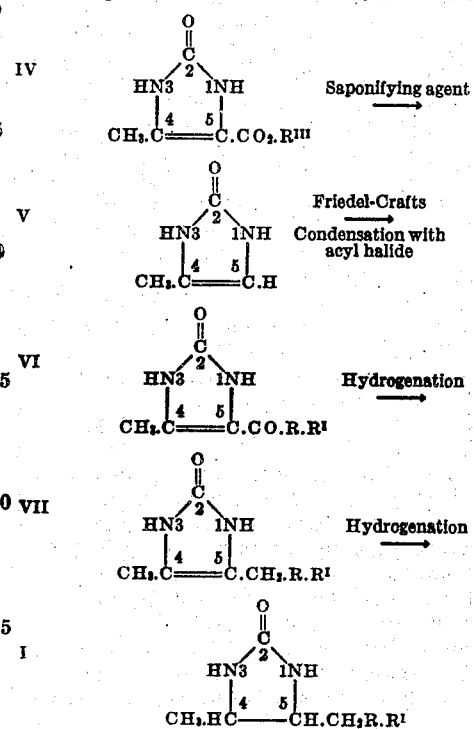

wherein R and $R^I$ have the same meaning as in general Formula I above, and R^III stands for a lower alkyl.

I have found that my new method offers a general pattern for synthesizing desthiobiotin and its homologues in which side chains of varying structures are attached to the imidazolidone nucleus. I expected that in order to introduce the side chain into the molecule of compound V I should be able to proceed in a well established manner, which would be to transform the ester IV into the free acid by saponification, then convert the free acid into the acid chloride and use the latter in a malonic ester or aceto acetic ester condensation which would attach the side chain to the imidazolone ring. To my great surprise, I discovered that when I attempted to saponify ester IV with sodium hydroxide under mild conditions which may be followed by reacidification, the corresponding acid was not obtained, but decarboxylation took place and compound V, the methyl imidazolone, was isolated. The decarboxylation of imidazolone carboxylic acids has been occasionally reported, for instance, by Hilbert, J. Amer. Chemical Society 54, 3415 (1932), but in these instances decarboxylation occurred only under much more drastic conditions. Decarboxylation in solution under mild temperature conditions has never been described in imidazolone chemistry, and to find that it is possible was wholly unexpected.

The methyl imidazolone V is a compound not heretofore reported in literature. The introduction of a side chain in its 5-position by a Friedel-Crafts condensation using aluminum chloride as a catalyst to form compound VI is a reaction without precedent. C. A. Thomas, in his book on "Anhydrous Aluminum Chloride in Organic Chemistry," New York, 1941, pages 193–194, states: "A few isolated instances cite its (i. e. aluminum chloride) use in reactions effected with heterocyclic compounds of nitrogen." Among the examples given by the author no Friedel-Crafts condensations with imidazoles or imidazolone derivatives are reported. On the contrary, in an investigation on Friedel-Crafts reactions with heterocyclic compounds, E. Ochiai, J. Pharm. Soc., Japan, 60, 164 (German Abstract p. 55) (1940); C. A. 34, 5450 (1940), stated that 4-methyl imidazole and 2-phenyl-4-methyl imidazole failed to react with acylhalides.

The ease of hydrogenation of the keto derivative obtained by the Friedel-Crafts condensation is surprising, since it is known that keto groups under mild conditions are reduced only to secondary alcohols, and it is further reported by Hilbert that the imidazolone nucleus is quite resistant to hydrogenation under mild conditions.

The melting points of the synthetic 4-methyl-5-imidazolidone(2) caproic acid and of its methylester were found to be at 161–163° C. and 71.5–72° C., respectively. For desthiobiotin isolated from biotin and its methylester du Vigneaud reported melting points at 157–158° C. and 69–70° C., respectively.

Furthermore, the synthetic 4-methyl-5-imidazolidone(2) caproic acid is optically inactive in contrast to the desthiobiotin isolated from biotin. The synthetic compound tested as a growth factor on *Saccharomyces cereviseae* revealed a potency equal to about 50% of the growth promoting activity of biotin and of optically active desthiobiotin derived from biotin. When tested with *Lactobacillus casei* my optically inactive 4-methyl-5-imidazolidone(2)-caproic acid revealed anti-biotin potency similar to that shown by desthiobiotin derived from natural biotin by degradation.

In view of the similarity of the melting points of the synthetic 4-methyl-5-imidazolidone(2) caproic acid and its methyl ester with the melting points reported for the corresponding desthiobiotin preparations derived from biotin, and in view of the 50% potency found for the synthetic preparation, which is the usual ratio of activity between a racemic and an optically active compound, it is believed that my synthetic preparation which melts at from 161–163° C. and is optically inactive represents the racemic form of desthiobiotin. Desthiobiotin is obviously the cis-form of 4-methyl-5-imidazolidone(2)-caproic acid because of its derivation from biotin in which the two rings must exist in cis-position. Therefore the hydrogenation leading to this preparation must have furnished predominantly the cis-form. The trans-form which is normally also formed in this type of hydrogenation is present in the crystallization mother-liquor of the cis-form.

The following examples illustrate my invention:

OPTICALLY INACTIVE 4-METHYL-5-IMIDAZOLIDONE(2) CAPROIC ACID

EXAMPLE I

4-methyl-imidazolone(2)

34 g. 4-methyl-5-imidazolone(2) carboxylic acid ethyl ester were dissolved in 215 cc. 0.93 N NaOH (1 mol) and the solution kept 68 hours at 50–55°. After cooling it was neutralized to pH 7 by gradual addition of 37.5 cc. 5N HCl, which was accompanied by much carbon dioxide evolution and crystallization of the reaction product. The mixture was stirred in an ice bath for 1 hour, the methylimidazolone filtered off and washed chlorine free with some ice cold water. After drying in an oven at 60°, a first crop of 6.6 g. was obtained. M. P. 184–192°.

The mother-liquor was concentrated in vacuo, while the pH, which had the tendency to increase, was adjusted to 7 by gradual addition of 7 cc. N HCl, and was finally brought to dryness. The white residue was extracted 3 times with 35 cc. of boiling absolute ethanol, and once with 95% ethanol. The alcoholic extracts, after separation from the undissolved sodium chloride, were concentrated to dryness, thus yielding a second crop of 8.55 g. methylimidazolone melting at ca. 178°.

Total yield: 15.15 g. (77.5%). The crude material was directly used for the next step.

Sometimes the first crop of reaction product did not crystallize directly, but only after partial concentration of the solution in vacuo.

To obtain a pure sample, the substance was twice recrystallized from 2 volumes boiling water. M. P. 202.5–204.5 (after softening at 190°). For the analysis it was sublimed at 1 mm. (200° bath).

$C_4H_6ON_2$ Calc.: C 48.97  H 6.16  N 28.56%
(98.11)    Found:  49.19    6.09    28.89%

The substance is soluble in water, methanol, ethanol, acetone, also in hot dioxane, ethylacetate and nitrobenzene; insoluble in benzene, chloroform, ether and petroleum ether.

The aqueous or alcoholic solution reduces ammoniacal silver nitrate and gives with ferric chloride solution a deep purple coloration.

EXAMPLE II

Diacetyl-4-methyl-imidazolone(2)

0.98 g. methyl-imidazolone (Ex. I) was refluxed with 10 cc. acetic anhydride for 20 minutes. About 3 cc. of the solvent were distilled off at ordinary pressure, and the rest concentrated in vacuo. A partially crystallized yellow oil was obtained. It was boiled with ca. 30 cc. ether, the solution concentrated to a small volume, and then left to crystallize in an ice bath. After filtering and washing with cold ether, 1.46 g. crystals melting at 76–79° were obtained (80.3% of the theory). For the analysis, the substance was sublimed at 1 mm. and at a bath temperature of 100–110°. White crystals melting at 78.5–80.5°.

$C_8H_{10}O_3N_2$ Calc.: C 52.74  H 5.53  N 15.38%
(182.18) Found: 52.63  4.99  15.56%
             52.99  4.94

EXAMPLE III

4-methyl-5-imidazolone(2)-(ε-keto-caproic acid) ethyl ester 5.46 g. methyl-imidazolone (Ex. I) were suspended in 50 cc. nitrobenzene. 11.1 g. (1.04 mol) of adipic acid ethyl ester chloride were added, and the mixture stirred well in a three-neck flask fitted with an airtight mechanical stirrer and ascending condenser. With cooling in an ice bath 15 g. (2 mols) anhydrous aluminum chloride were added, which readily went into solution, accompanied by heat evolution. Then, with continuous stirring, the temperature was raised to 60–65° and maintained there for 5 hours. At that time, the evolution of HCl had completely stopped.

The reaction mixture was a brown, viscous liquid. It was taken up with 50 g. crushed ice and 100 cc. ether, whereupon yellowish crystals separated which were washed chlorine and nitrobenzene-free with water and ether. After drying at 100° in vacuo, 7.67 g. of the reaction product were obtained. 54.0% of the theory. M. P. 170° (unsharp). By recrystallization in 75 cc. of 50% ethanol, with addition of norite, 6.73 g. (47.5%) still yellowish crystals, M. P. 171.5–173° were obtained.

$C_{12}H_{18}O_4N_2$ Calc.: C 56.68  H 7.14  N 11.02  $C_2H_5O$ 18.60%
(254.28) Found: 56.87  6.83  11.78  18.69%
             56.98  7.10

The substance is soluble in alcohol and acetic acid, insoluble in water and ether. It gives only a very slight orange coloration with ferric chloride.

The free acid is obtained from this ester by refluxing with a slight excess of normal sodium hydroxide and acidifying with HCl. White crystals melting at from 210–212° C.

$C_{10}H_{14}O_4N_2$ Calc.: C 53.09  H 6.24  N 12.38%
(226.23) Found: 53.31  6.03  11.63%
                           11.61%

The ketonic nature of this compound is proven by the preparation of an oxime. The free acid was heated in aqueous solution with an excess of equimolecular amounts of hydroxylamine hydrochloride and sodium hydroxide. From this solution a crystalline substance melting at from 224–226° (dec.) was obtained.

$C_{10}H_{15}O_4N_3$ Calc.: C 49.78  H 6.27  N 17.42%
(241.25) Found: 49.94  6.07  17.78%

EXAMPLE IV

Diacetyl-4-methyl-5-imidazolone(2)-(ε-keto caproic acid) ethyl ester

The preparation of this diacetyl derivative gives further proof of the ketonic nature of the keto ester.

3.75 g. of keto ester (Ex. III) were refluxed 20 minutes with 15 cc. acetic anhydride. The solution was concentrated in vacuo, the residue again refluxed with 15 cc. acetic anhydride and reconcentrated. The residue was taken up in cold ethanol, whereupon crystals separated which were filtered and washed with ethanol. Yield: 4.03 g. (81.2% of the theory). M. P. 68–70°. For the analysis the substance was recrystallized from ethanol and sublimed at 0.7 mm. and 160° bath temperature. White crystals melting at 72.5–74°, soluble in ether, benzene, and hot ethanol, insoluble in water.

$C_{16}H_{22}O_6N_2$ Calc.: C 56.79  H 6.55  N 8.28  $CH_3CO$* 25.45%
(338.35)[1] Found: 57.04  6.37  8.56  27.53%
*=A. Elek and A. Harte, Ind. and Eng. Chem. Anal. Ed. 8, 267 (1936).

EXAMPLE V

4-methyl-5-imidazolone(2) caproic acid ethyl ester 5.08 g. keto ester (Ex. III) dissolved in 50 cc. acetic acid, were hydrogenated at ordinary pressure with 2 g. prehydrogenated Adam's platinum catalyst. In 30 minutes 977 cc. hydrogen were taken up (theory: for two mols of hydrogen 975 cc. at 24°). The catalyst was filtered off, the solution concentrated in vacuo, the residue was taken up in alcohol, and then again concentrated. The crystalline residue was finally taken up in 10 cc. alcohol, and the mixture cooled in a dry ice bath. The white crystals were filtered, washed with cold ethanol and ether. Yield: 3.36 g. (70% of the theory), M. P. 194–196°. 100 mg. were recrystallized from 1.5 cc. ethanol and gave 70 mg. material of the same melting point. For the analysis a sample was sublimed at 200° at 0.4 mm.

$C_{12}H_{20}O_3N_2$ Calc.: C 59.98  H 8.39  N 11.66%
(240.30) Found: 60.03  8.44  12.02%

The substance is fairly soluble in alcohol and acetic acid, little soluble in ether.

EXAMPLE VI

Optically inactive 4-methyl-5-imidazolidone(2) caproic acid ethyl ester 360 mg. of crude methyl-imidazolone caproic acid ethyl ester (Ex. V) dissolved in 7 cc. acetic acid were hydrogenated with 400 mg. Adam's platinum catalyst. Temperature: 23°. Hydrogen uptake in 2 hours and 20 minutes: 36.5 cc. (theory 38.5 cc.). The catalyst was filtered off, the acetic acid evaporated, the residue taken up with alcohol, and finally distilled at 0.5–0.7 mm. in a 200–220° bath. A fore-run was separated, and 220 mg. of an oil, which solidified to a waxy crystalline mass, were obtained (60.6% of the theory). Soluble in alcohol and ether, insoluble in water.

For the analysis the substance was distilled a second time. M. P. 54–56°.

$C_{12}H_{22}O_3N_2$ Calc.: C 59.48  H 9.15  N 11.56%
(242.32) Found: 59.39  9.15  11.64%

The substance is insoluble in water and very soluble in organic solvents, except in petroleum ether.

The preparation was examined for yeast-growth activity. It was found to have a potency equal to 42% of the activity of biotin by the method of Snell, Eakin & Williams, J. Am. Chem. Soc. 62, 175 (1940).

EXAMPLE VII

*Optically inactive 4-methyl-5-imidazolidone(2)-caproic acid*

520 mg. crude, not distilled and not quite dry 4-methyl-5-imidazolidone(2)-caproic acid ethyl ester (Ex. VI) obtained from 480 mg. methylimidazolone caproic ethyl ester, were dissolved in 1 cc. alcohol and heated with 5 cc. N NaOH in a 50° bath for 15 minutes. The mixture became clear after 5 minutes of heating. The solution was filtered and acidified with 5 cc. N HCl. 4-methyl-5-imidazolidone(2) caproic acid crystallized readily on cooling. It was washed chlorine-free with 4 cc. water. Yield: 290 mg. (67.6% of the theory). M. P. 159–161°. 240 mg. were recrystallized with 5 cc. water, and 220 mg. substance melting at 160–162° were obtained. Soluble in alkali, hot water and alcohol, insoluble in organic solvents.

$C_{10}H_{18}O_3N_2$  Calc.: C 56.05  H 8.47  N 13.08%
(214.26)           Found: 55.97   8.20    13.42%

In a subsequent preparation a higher melting point was found (see Ex. VIII).

I found it possible to reduce the keto ester (Ex. III) into the ethyl ester of Example VI in one step, as shown by the following example:

EXAMPLE VIII

*Optically inactive 4-methyl-5-imidazolidone(2) caproic acid by one step hydrogenation of ketoester*

2.54 g. ketoester (Ex. III) were hydrogenated with 1 g. platinum catalyst in 30 cc. acetic acid. Temperature: 23°. Hydrogen uptake: 733 cc. in 5½ hours (theory for three mols hydrogen 730 cc.). The crude, not crystallizing 4-methyl-5-imidazolidone(2)-caproic acid ethylester obtained after evaporation of the acetic acid was dissolved in 5 cc. ethanol, saponified by treatment at 50° for 20 minutes with 25 cc. N NaOH, and the solution was acidified with 25 cc. N HCl. The crystallized 4-methyl-5-imidazolidone(2)-caproic acid was washed with ice cold water. Yield: 1.74 g. (81.3% of the theory). M. P. 160.5–162°.

By two recrystallizations from 13 volumes of boiling water the melting point was raised to 161–163°.

Potency: 51% of the activity of biotin.

$C_{10}H_{18}O_3N_2$  Calc.: N 13.08%
(214.26)           Found: 12.84%

EXAMPLE IX

*Optically inactive 4-methyl-5-imidazolidone(2)-caproic acid methylester*

To 500 mg. crude optically inactive 4-methyl-5-imidazolidone(2) caproic acid, dissolved in 5 cc. methanol, were added 31 cc. of about 0.5 N diazomethane solution in ether, until the yellow color persisted. The ester was evaporated in vacuo, and the residue twice distilled at 0.8 mm. in a 200° bath. Yield: 200 mg. The methyl ester was recrystallized from 10 cc. boiling ether, and a preparation melting at 71.5–72° and showing a potency of 38% of that of biotin was thus obtained. Soluble in alcohol, less soluble in ether, insoluble in water.

$C_{11}H_{20}O_3N_2$  Calc.: C 57.87  H 8.83  N 12.27%
(228.29)           Found: 58.00   8.75    12.09%

4-METHYL-5-ETHYL-IMIDAZOLIDONE(2)

EXAMPLE X

*4-methyl-5-acetyl-imidazolone(2)*

1.96 g. methyl imidazolone (Ex. I) was reacted with 1.35 g. acetyl-bromide (1 mol) and 5.4 g. aluminum chloride (2 mols) in 20 cc. nitro-benzene. Temperature: 60° time: 5 hours. The reaction mixture was taken up with ca. 50 g. ice, the nitro-benzene was eliminated by steam distillation, and the residual solution (75 cc.) was decolorized by boiling with charcoal.

On cooling, 1.39 g. (49.5% of the theory) crystals separated. M. P. 293–296° (dec.). The crude material was recrystallized in 70 cc. water. Yield: 0.9 g.; M. P. 321° (dec.). For the analysis 150 mg. were recrystallized a second time in 10 cc. water, and 130 mg. slightly yellowish crystals, melting at 322° (dec.) were obtained.

$C_6H_8O_2N_2$  Calc.: C 51.42  H 5.75  N 19.99%
(140.14)        Found: 51.22   5.53    19.92%

The substance is soluble in hot water and ethanol, strong acids and alkali. It is almost insoluble in cold water and organic solvents. The alcoholic solution gives with ferric chloride a yellow coloration. Refluxing with 2N NaOH for one hour did not attack the substance. Refluxing 2 hours with 20% hydrochloric acid gave a 70% recovery but since the mother-liquor gave a strong red ferric chloride reaction, some cleavage must have taken place. The substance gave an oxime decomposing at about 297° C.

$C_6H_9O_2N_3$  Calc.: C 46.46  H 5.85  N 27.09%
(155.16)        Found: 46.00   5.24    26.95%

The preparation of triacetyl 4-methyl-imidazolone(2) gave further proof of the constitution of this compound. Triacetyl 4-methyl-imidazolone(2) had a melting point of from 72–73° C. and analyzed as follows:

$C_{10}H_{12}O_4N_2$ Calc.: C 53.96 H 5.00 N 12.50 2($CH_3CO$) 38.40%
(224.21)           Found: 53.54  5.16        12.97 3($CH_3CO$) 57.61%
                                                              52.23%
                                                              52.15%

EXAMPLE XI

*4-methyl-5-ethyl-imidazolidone(2)*

80 mg. 4-methyl-5-acetyl-imidazolone (Ex. X) were hydrogenated with 40 mg. platinum catalyst in 8 cc. acetic acid. Temperature 22°. Hydrogen uptake: 42.1 cc. in 90 minutes. (Theory for 3 mols of hydrogen 41. cc.) After filtration and evaporation of the solvent, the reaction product was sublimed at 0.4 mm. and 145–155° bath temperature. Yield: 50 mg. (68.5% of the theory). M. P. 167–171°.

$C_6H_{12}ON_2$  Calc.: C 56.22  H 9.44  N 21.86%
(128.18)        Found: 56.20   9.35    21.81%

The product is soluble in water, ethanol and dioxane. It gives no ferric chloride reaction.

EXAMPLE XII

*4-methyl-5-imidazolidone(2) butyric acid*

This compound was obtained in the manner of the above described methods. 4-methyl-imidazolone-(2) was reacted in a Friedel-Crafts condensation with succinic acid methyl ester chloride and methyl-(4-methyl-5-imidazolone(2)-γ-ketobutyrate melting at 214.5–215.5° C. was thus obtained.

$C_9H_{12}O_4N_2$ Calc.: C 50.94  H 5.70  N 13.20%
(212.20)         Found: 51.29   5.78    13.57%
                                        13.37%

The latter was reduced by the above described one-step reduction method and the reduction product was saponified to obtain the 4-methyl-5- imidazolidone-2-butyric acid melting at 138.5–139.5° C.

C₉H₁₄O₃N₂ Calc.: C 51.60 H 7.58 N 15.05%
(198.22) Found: 51.39 7.27 15.17%

In the appended claims, the imidazolone nucleus is formulated in the normal manner (Beilstein, Handb. der Org. Chemie 24, 16 (1936),

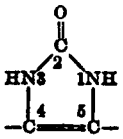

although the properties of some of the derivatives described here may find a better characterization by the tautomeric formulae

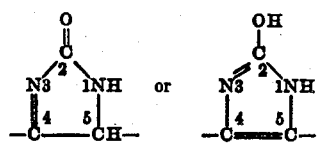

I wish it to be understood therefore that the formula

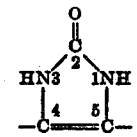

as employed herein and in the appended claims embraces all the tautomeric forms.

What I claim is:

1. Process of synthesizing an imidazolidone compound which comprises treating an imidazolone ester derivative of the formula

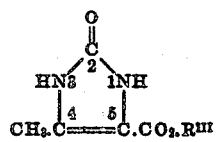

with a saponifying agent in solution which results in 4-methyl-imidazolone(2)

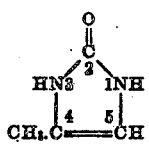

condensing the latter with an acylhalide of the formula

Halogen.CO.R.R$^I$ in a Friedel-Crafts reaction leading to the keto compound

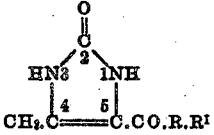

and treating the condensation product with a reducing agent whereby the imidazolidone compound

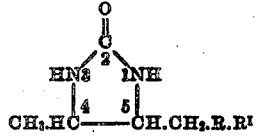

is obtained, R$^{III}$ in these formulae standing for lower alkyl, while R denotes lower alkylene, and R$^I$ means a radical selected from the group consisting of hydrogen and COOR$^{II}$, wherein R$^{II}$ stands for a radical selected from the group consisting of hdrogen and lower alkyl.

2. Process for synthesizing an imidazolidone compund which comprises heating an imidazolone ester derivative of the formula

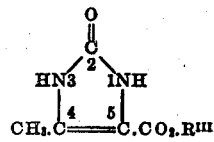

in aqueous alkaline solution at a temperature of from 50 to 60° C. until saponification is complete, and neutralizing the solution which results in 4-methyl imidazolone(2)

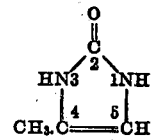

condensing the latter with an acylhalide of the formula

Halogen.CO.R.R$^I$ in a Friedel-Crafts reaction leading to the keto compound

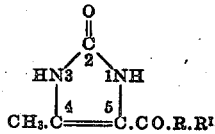

and treating the condensation product with a reducing agent whereby the imidazolidone compound

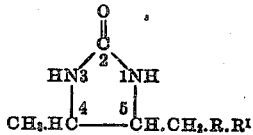

is obtained, R$^{III}$ in these formulae standing for lower alkyl, while R denotes lower alkylene, and R$^I$ means a radical selected from the group consisting of hydrogen and COOR$^{II}$, wherein R$^{II}$ stands for a radical selected from the group consisting of hydrogen and lower alkyl.

3. Process for synthesizing an imidazolidone compound which comprises heating an imidazolone ester derivative of the formula

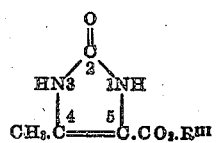

in aqueous alkaline solution at a temperature of from 50 to 60° C. until saponification is complete and neutralizing the solution which results in 4-methyl-imidazolone(2)

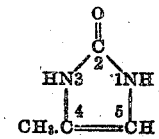

condensing the latter with an acylhalide of the formula

Halogen.CO.R.R$^I$ in the presence of aluminum chloride leading to the keto compound

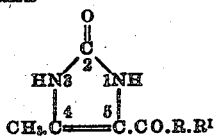

and treating the condensation product with a reducing agent whereby the imidazolidone compound

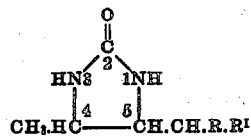

is obtained, $R^{III}$ in these formulae standing for lower alkyl, while R denotes lower alkylene, and $R^I$ means a radical selected from the group consisting of hydrogen and $COOR^{II}$, wherein $R^{II}$ stands for a radical selected from the group consisting of hydrogen and lower alkyl.

4. Process of synthesizing an imidazolidone compound which comprises treating an imidazolone ester derivative of the formula

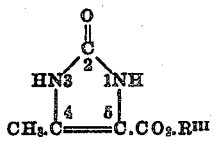

with a saponifying agent in solution which results in 4-methyl-imidazolone(2)

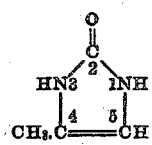

condensing the latter with an acylhalide of the formula

Halogen.CO.R.$R^I$ in a Friedel-Crafts reaction leading to the keto compound

and treating the condensation product with a quantity of reducing agent sufficient to introduce no more than two molecules of hydrogen into the molecule whereby the compound

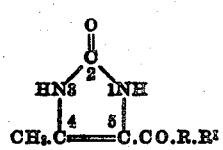

is formed, and further reducing said compound whereby the imidazolidone compound

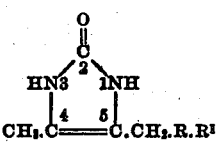

is obtained, $R^{III}$ in these formulae standing for lower alkyl, while R denotes lower alkylene, and $R^I$ means a radical selected from the group consisting of hydrogen and $COOR^{II}$, wherein $R^{II}$ stands for a radical selected from the group consisting of hydrogen and lower alkyl.

5. Process of synthesizing optically inactive 4-methyl-5-imidazolidone(2) caproic acid which comprises heating 4-methyl-5-imidazolone(2) carboxylic acid ethyl ester with an equimolecular amount of normal sodium hydroxide solution at a temperature of from 50–55° C. until saponification is complete, neutralizing the solution with hydrochloric acid and isolating the resulting 4-methyl-imidazolone(2), reacting the latter suspended in nitrobenzene with ethyl adipochloride and aluminum chloride at a temperature of from 60–65° C. until evolution of hydrochloric acid ceases, isolating the resulting condensation product, and hydrogenating it in acetic acid solution at room temperature until three mols of hydrogen have been taken up, subjecting the resulting crude product to saponification with an excess of normal sodium hydroxide at 50° C. and isolating the free optically inactive 4-methyl-5-imidazolidone (2) caproic acid by acidification with mineral acid.

6. Process of synthesizing optically inactive 4-methyl-5-imidazolidone(2)-butyric acid which comprises heating 4-methyl-5-imidazolone(2)-e carboxylic acid ethylester with an equimolecular amount of normal sodium hydroxide solution at a temperature of from 50–55° C. until saponification is complete, neutralizing the solution with hydrochloric acid and isolating the resulting 4-methyl-imidazolone(2), reacting the latter suspended in nitrobenzene with methyl succino chloride and aluminum chloride at a temperature of from 60–65° C. until evolution of hydrochloric acid ceases, isolating the resulting condensation product, and hydrogenating it in acetic acid solution at room temperature until three mols of hydrogen have been taken up, subjecting the resulting crude product to saponification with an excess of normal sodium hydroxide at 50° C. and isolating the free optically inactive 4-methyl-5-imidazolidone(2)-butyric acid by acidification with sulphuric acid.

7. As compositions of matter, d,l-imidazolidone compounds of the general formula

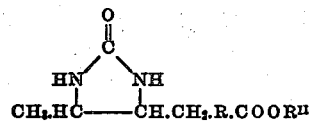

wherein R stands for a lower alkylene radical, and wherein $R^{II}$ stands for a radical selected from the group consisting of hydrogen and lower alkyl.

8. The compounds of claim 7 wherein $R^{II}$ is H.

9. The compounds of claim 7 wherein $R^{II}$ is lower alkyl.

10. The process of synthesizing an imidazolidone compound which comprises condensing 4-methyl-imidazolone(2) with an acylhalide of the formula Halogen.CO.R.$R^I$ in a Friedel-Crafts reaction leading to the keto compound

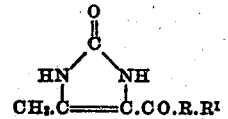

and hydrogenating this keto condensation product whereby the imidazolidone compound with the formula

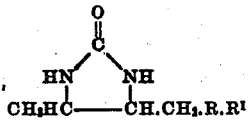

is obtained, wherein R denotes a lower alkylene radical and $R^I$ denotes a radical from the group consisting of H and $COOR^{II}$, wherein $R^{II}$ is selected from the group consisting of hydrogen and lower alkyl.

11. The process of synthesizing an imidazolidone compound which comprises condensing 4-methyl-imidazolone(2) with an acylhalide of the formula

in the presence of aluminum chloride leading to the keto compound

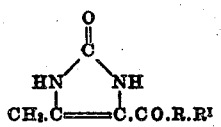

and hydrogenating this keto condensation product whereby the imidazolidone compound with the formula

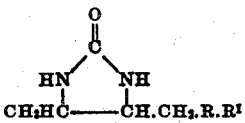

is obtained, wherein R denotes a lower alkylene radical and $R^I$ denotes a radical selected from the group consisting of H and $COOR^{II}$, wherein $R^{II}$ is selected from the group consisting of hydrogen and lower alkyl.

12. The process of synthesizing imidazolidone compounds which comprises hydrogenating a compound of the formula

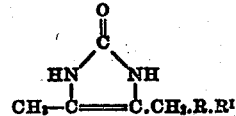

wherein R denotes a lower alkylene radical and $R^I$ denotes a radical selected from the group consisting of H and $COOR^{II}$, wherein $R^{II}$ is selected from the group consisting of hydrogen and lower alkyl.

13. The process of synthesizing imidazolidone compounds which comprises hydrogenating a keto compound of the formula

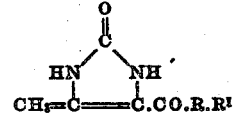

to yield an imidazolidone compound of the formula

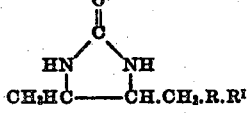

wherein R denotes a lower alkylene radical, and $R^I$ denotes a radical selected from the group consisting of H and $COOR^{II}$, wherein $R^{II}$ is a member of the group consisting of hydrogen and lower alkyl.

14. The method of claim 13 in which $R^I$ is hydrogen.

15. The method of claim 13 in which $R^I$ is lower alkyl.

16. As a composition of matter, d,l-4-methyl-5-imidazolidone(2) caproic acid.

17. As a composition of matter, d,l-4-methyl-5-imidazolidone(2) caproic acid ethylester.

18. As a composition of matter, d,l-4-methyl-5-imidazolidone(2) butyric acid.

ROBERT DUSCHINSKY.